United States Patent [19]

McCurry et al.

[11] Patent Number: 5,632,578

[45] Date of Patent: May 27, 1997

[54] EXHAUST STATOR AND FAN FOR A POWER TOOL

[75] Inventors: Ronald C. McCurry, West Union; Paul W. Niemela, Pickens, both of S.C.

[73] Assignee: Ryobi North America, Easley, S.C.

[21] Appl. No.: 605,907

[22] Filed: Feb. 23, 1996

Related U.S. Application Data

[60] Provisional application No. 60/003,399 Sep. 6, 1995.

[51] Int. Cl.$^6$ .............................. B27C 5/10; B23C 1/20
[52] U.S. Cl. ..................... 409/136; 409/137; 144/252.1; 144/136.95; 408/61; 15/412; 310/62
[58] Field of Search ..................... 409/135–137, 409/182; 310/47, 50, 62, 63; 415/220; 144/252.1, 252.2, 136.95, 154.5; 417/423.14, 423.1, 423.7; 408/56, 61, 67; 173/63, 67, 75, 79; 15/412, 413

[56] References Cited

U.S. PATENT DOCUMENTS

| | | | |
|---|---|---|---|
| 2,970,234 | 1/1961 | Erickson | 310/63 |
| 3,811,361 | 5/1974 | Seely et al. | 409/182 |
| 4,051,880 | 10/1977 | Hestily | 409/182 |
| 5,311,089 | 5/1994 | Stroetgen et al. | 310/50 |
| 5,375,637 | 12/1994 | Matsumoto et al. | 409/182 |

*Primary Examiner*—M. Rachuba
*Assistant Examiner*—Kenneth J. Hansen
*Attorney, Agent, or Firm*—Brooks & Kushman P.C.

[57] ABSTRACT

A router includes a motor housing having first and second clam shell halves forming an air inlet and a stator forming an air outlet, the housing having a central axis therethrough. An electric motor having a rotary armature, an armature shaft and a stationary member is fixed with respect to the housing. An axial fan is fixed to the armature shaft and positioned between the rotary armature and the stator for drawing air across the armature and stationary member. The fan has a plurality of radially extending fan blades tilted with respect to the central axis for forcing air in a substantially helical path. The stator includes a plurality of radially extending stator blades oppositely tilted with respect to the fan blades and the central axis for receiving air moving in a helical path from the fan blades. The stator blades are configured to cause air to swirl in a predictable manner when leaving the housing.

16 Claims, 10 Drawing Sheets

EXHAUST STATOR AND FAN FOR A POWER TOOL

CROSS REFERENCE TO RELATED APPLICATION

This is a utility application claiming the benefit of provisional application Ser. No. 60/003,399 filed Sep. 6, 1995.

The present invention relates to routers, and more particularly to an exhaust stator for a router.

BACKGROUND OF THE INVENTION

Typically, routers include a motor housing with first and second clam shell halves and a stator which collectively form an internal cavity. The motor assembly includes a rotary armature and a stationary laminate stack. In order to cool the laminate stack and armature in operation, a fan is positioned between the laminate stack and the stator for drawing air across the armature and laminate stack. The fan acts as an axial pump by pumping air axially through the motor housing from a vent on top of the motor housing, along the sides of the laminate stack, and finally through the stator on the bottom, and out of the router. The stator usually includes a plurality of straight fins or vanes to direct the air out of the housing. This configuration usually results in random turbulent air conditions near the router bit as the air passes through the stator.

With this random turbulent air movement, saw dust and debris is not efficiently moved away from the cutting area. Rather, the saw dust and debris covers the chip shield and moves about the cutting area in an undesirable manner. This random movement of chips can obstruct vision of the operator, and adversely affect the quality of the cut.

It is desirable to provide an air flow pattern around the router bit which carries saw dust and debris away from the router in an efficient manner. It is further desirable to avoid random turbulent air conditions near the router bit.

SUMMARY OF THE INVENTION

The present invention overcomes the above-referenced shortcomings of prior art router assemblies by providing a router assembly with an exhaust stator which causes a swirling action around the router bit to efficiently carry saw dust and debris away from the router bit in operation.

More specifically, the present invention provides a power tool such as router comprising a motor housing including first and second clam shell halves forming an air inlet and a stator forming an air outlet, the housing having a central axis therethrough. An electric motor includes a rotary armature, an armature shaft and a stationary member fixed with respect to the housing. An axial fan is fixed to the armature shaft and positioned between the rotary armature and stator for drawing air across the armature and stationary member. The fan has a plurality of radially extending fan blades tilted with respect to the central axis for forcing air in a substantially helical path. The stator includes a plurality of radially extending stator blades oppositely tilted with respect to the fan blades and the central axis for receiving air moving in a helical path from the fan blades.

Accordingly, an object of the present invention is to provide an exhaust stator for a router which eliminates random turbulent air conditions near the router bit.

Another object of the present invention is to provide an exhaust stator for a router which causes air to move in a swirling motion around the router bit in order to carry saw dust and debris away from the router bit in an efficient manner.

The above objects and other objects, features and advantages of the present invention are readily apparent from the following detailed description when taken in connection with the accompanying drawings.

DISCLOSURE OF THE INVENTION

Figure 1:
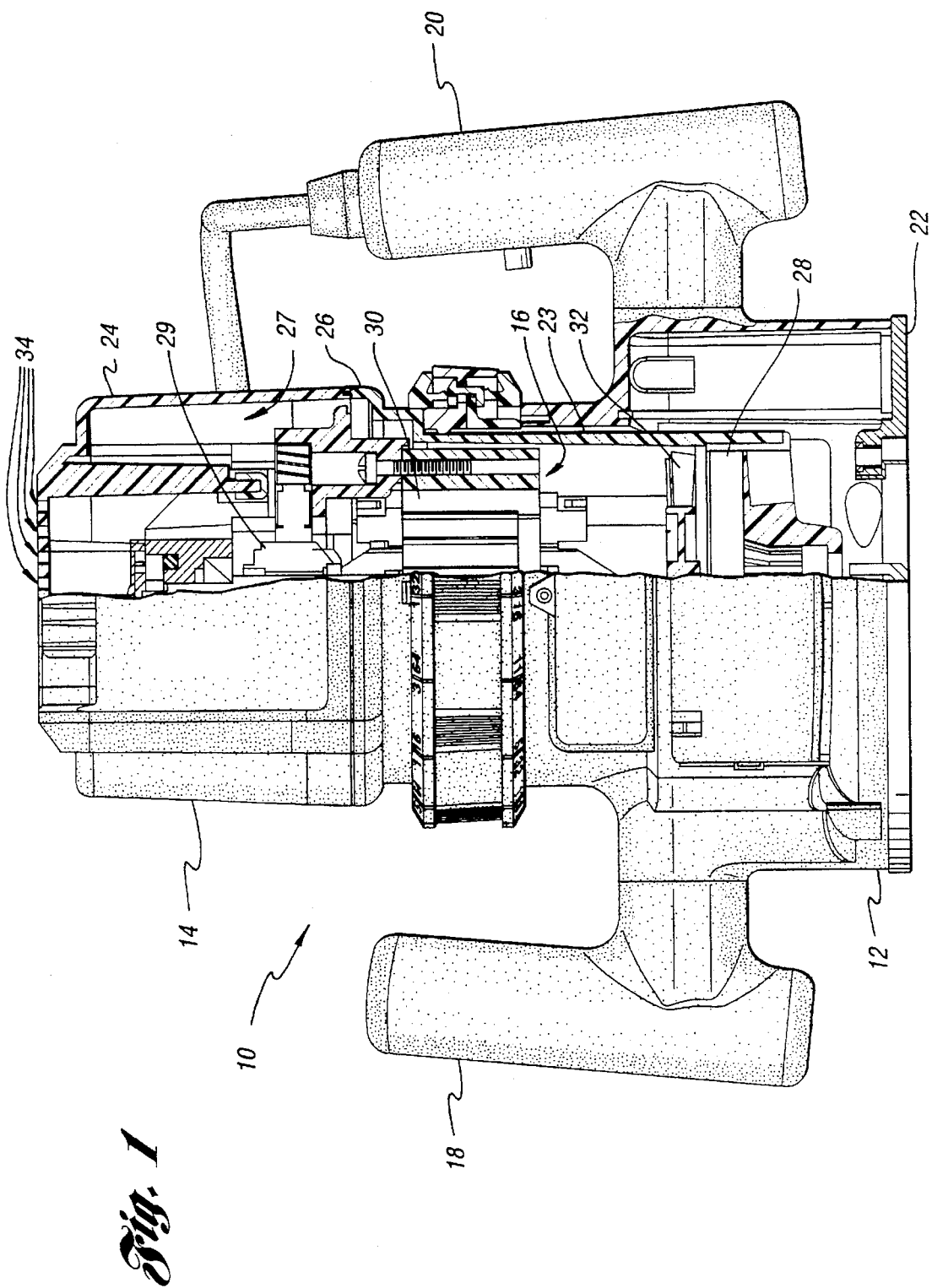
FIG. 1 shows a partially cut away side elevational view of a router in accordance with the present invention.
Figure 2:
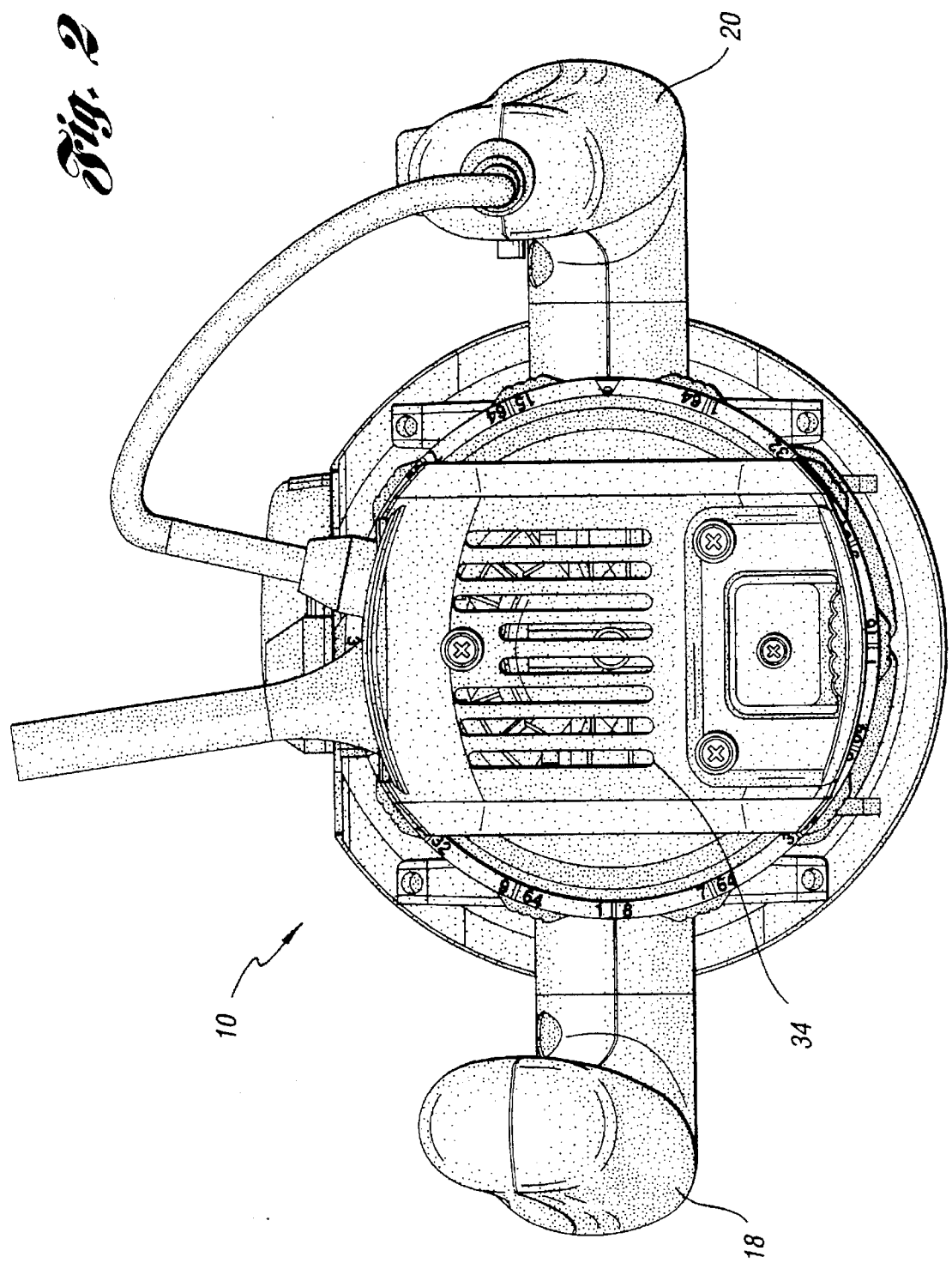
FIG. 2 shows an enlarged plan view of a router in accordance with the present invention.

A router for use in accordance with the present invention is shown in FIGS. 1 and 2, a partially cutaway side elevational view and an enlarged plan view of a router, respectively. The router 10 is made up of three main parts; base 12, motor housing 14, and motor assembly 16. The base 12 is provided with a pair of handles 18, 20, base plate 22 for cooperating with a workpiece and a tubular region 23 sized to receive a portion of the motor assembly 16.

A motor housing 14 includes first and second clamshell halves 24,26, and stator 28 for forming an internal cavity 27. The motor assembly 16 includes a rotary armature 29 and a stationary laminate stack 30. In order to cool the laminate stack 30 and armature 29 in operation, a fan 32 is positioned between the laminate stack 30 and the stator 28 for drawing air across the armature 29 and laminate stack 30. The fan 32 acts as an axial pump by pumping air axially through the motor housing 14 from the vent 34 on top of the motor housing 14 along the sides of the laminate stack 30, and finally through the stator 28 and out of the router 10.

Figure 18:
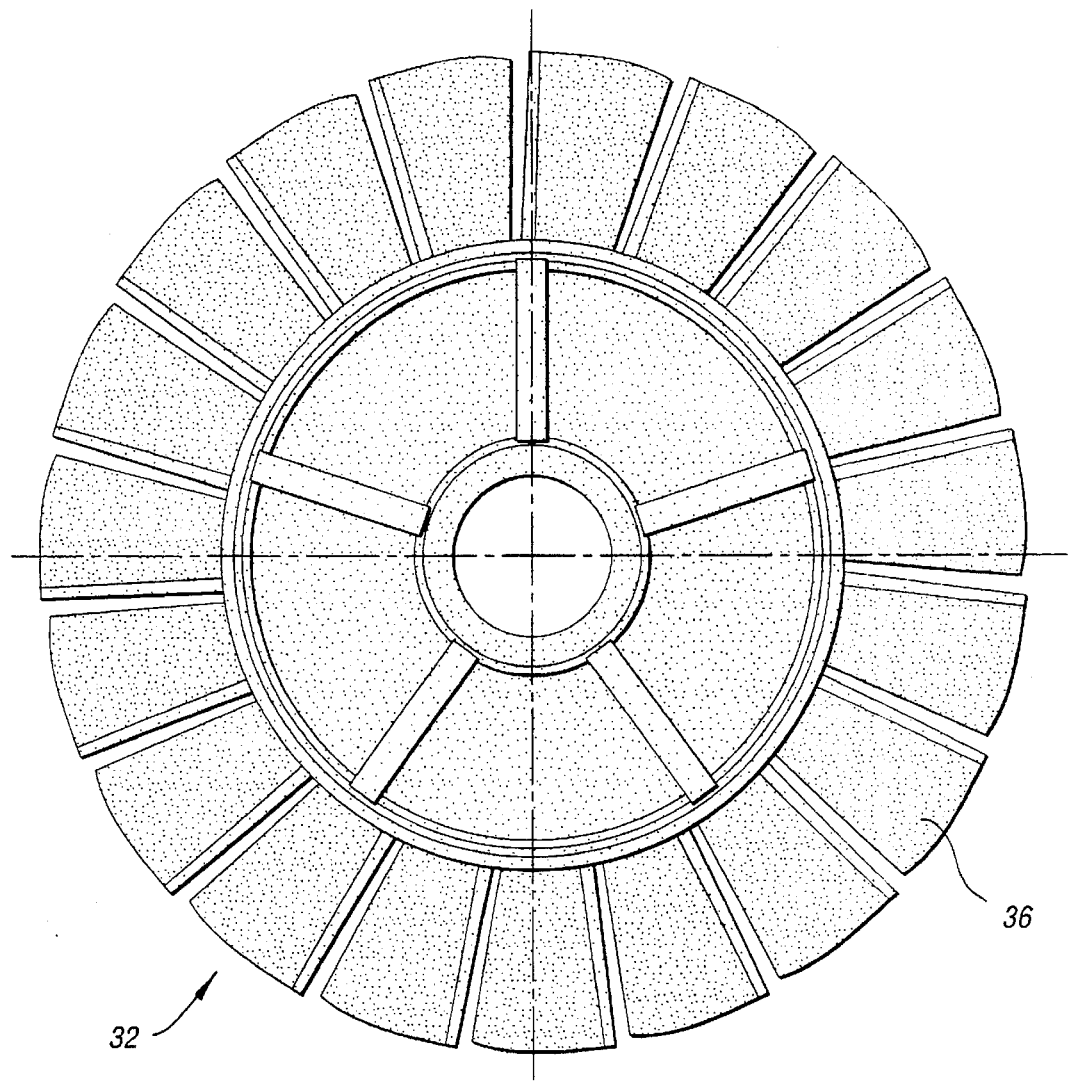
FIG. 18 shows a plan view of a fan for use in accordance with the present invention.
Figure 19:
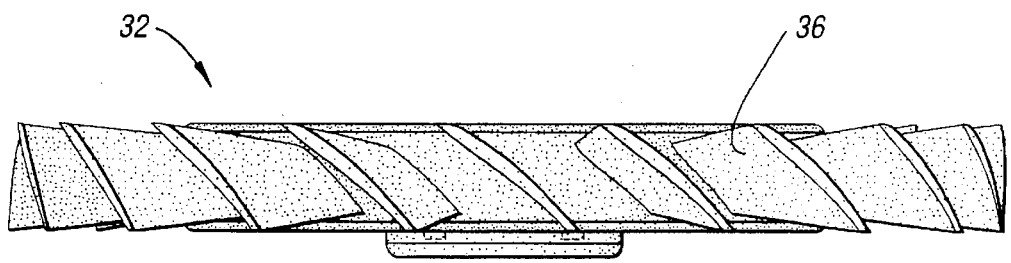
FIG. 19 shows a side view of the fan of FIG. 18.

As described above, it is desirable to control discharge of air through the stator 28 to avoid random turbulent air conditions near the router bit. It is particularly desirable to provide a swirling action around the router bit in order to carry saw dust and debris away from the router bit. Accordingly, the stator 28 is configured to create such a swirling action around the router bit. The fan 32 includes a plurality of radially extending fan blades 36, as shown in FIGS. 18 and 19, for drawing air through the motor housing 14 and for initiating swirling action of the air.

Figure 3:
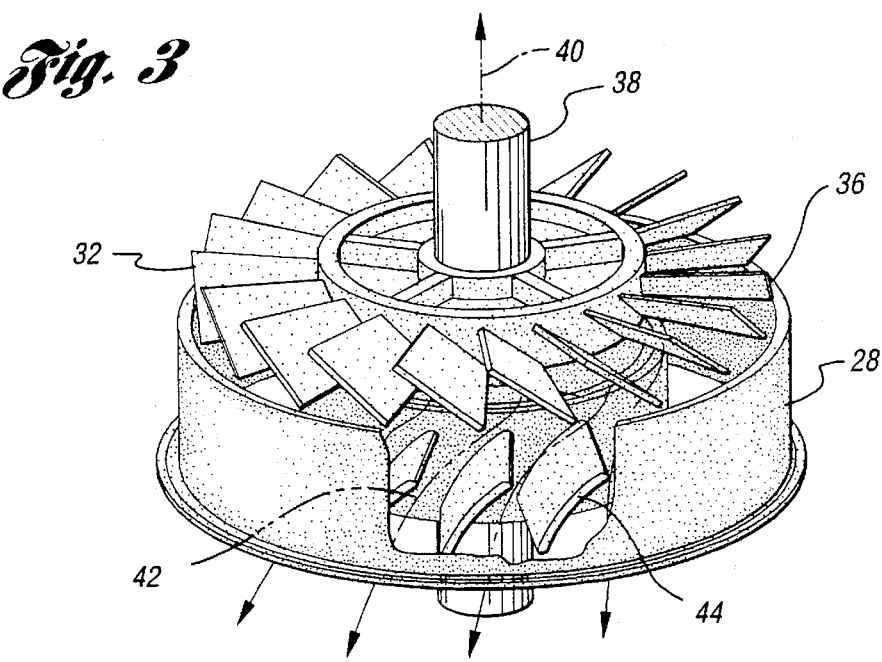
FIG. 3 shows a schematically arranged perspective cut away view of a stator and fan in accordance with the present invention.

FIG. 3 shows a schematically arranged perspective cutaway view of a stator 28 and fan 32. The fan blades 36 (shown schematically as flat blades) draw air through the vents 34 at the top of the housing 14, through the housing 14 for cooling the armature 29 and laminate stack 30, and force the air through the stator 28. The fan blades 36 extend radially with respect to the armature shaft 38, and are tilted with respect to the central axis 40 for forcing air in a substantially helical path 42, as shown in FIG. 3. The stator 28 includes a plurality of radially extending stator blades 44 which are oppositely tilted with respect to the fan blades 36 for receiving air moving in a helical path 42 from the fan blades 36. The stator blades 44 are oriented at a slightly steeper angle with respect to the central axis 40 than that of the helical path 42. Accordingly, the stator blades 44 receive the helically travelling air 42. The stator blades 44 include a slight air foil type curvature for deflecting the air out of the motor housing 14 through the bottom of the stator 28. With this stator blade configuration, air is caused to swirl in a predictable manner when leaving the stator 28, thereby carrying sawdust and debris away from the router bit.

Figure 4:
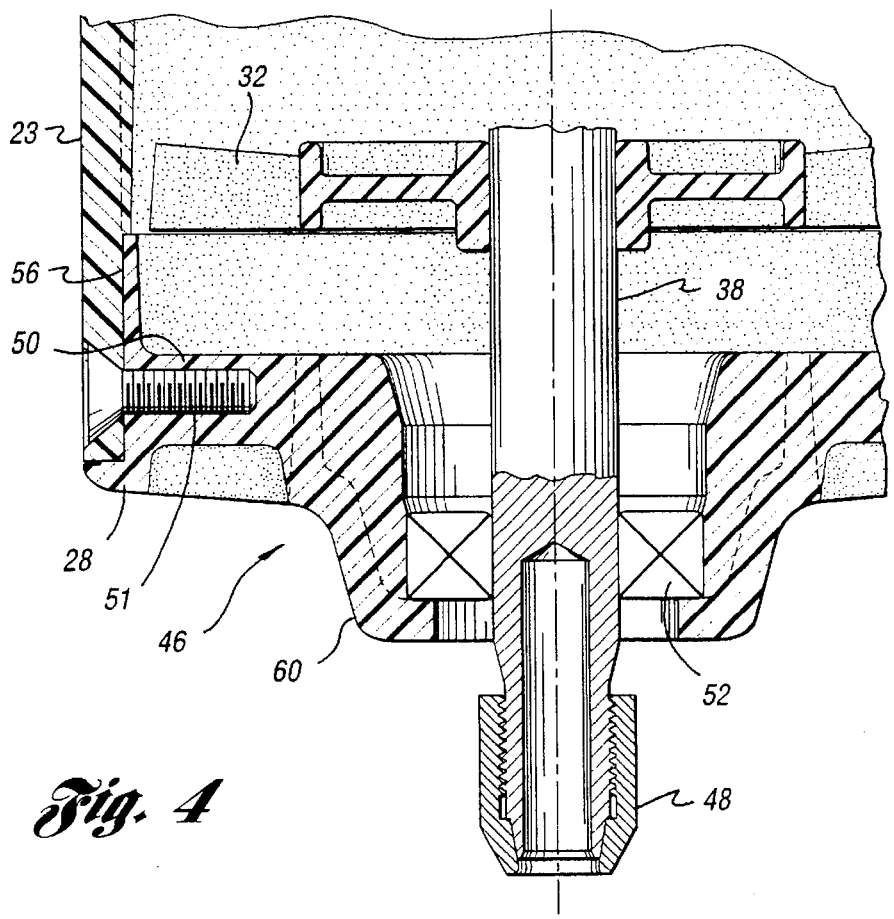
FIG. 4 shows a partially cut away sectional view of a first embodiment of a router lower assembly in accordance with the present invention.
Figure 5:
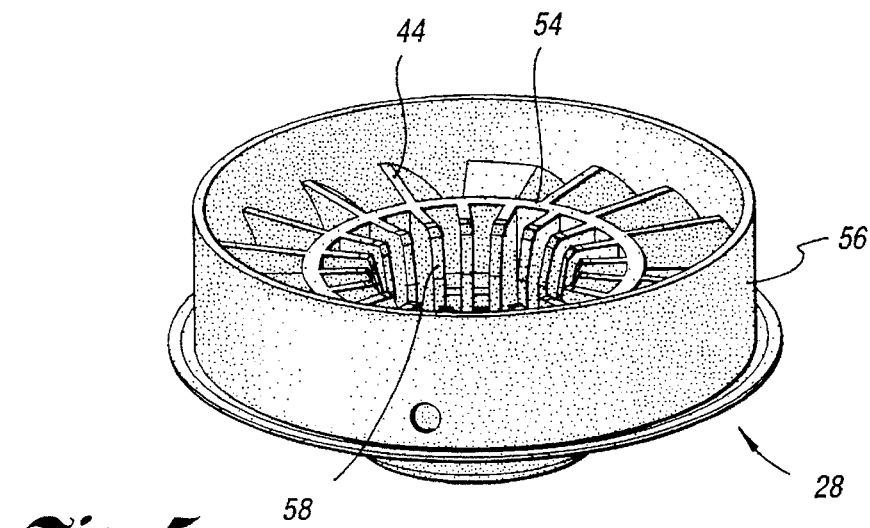
FIG. 5 shows a perspective view of a stator in accordance with the present invention.
Figure 6:
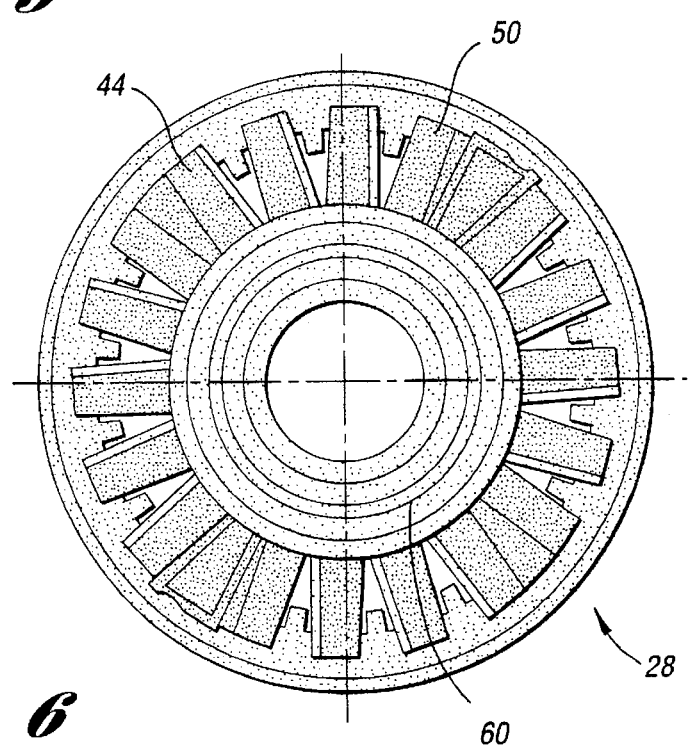
FIG. 6 shows a plan view of the stator shown in FIG. 5.
Figure 7:
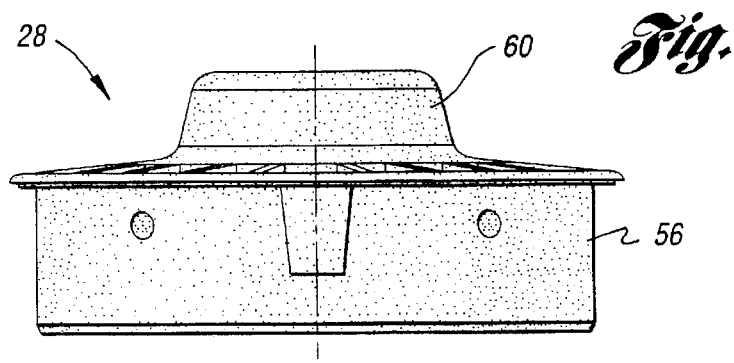
FIG. 7 shows a side view of the stator shown in FIG. 5.
Figure 8:
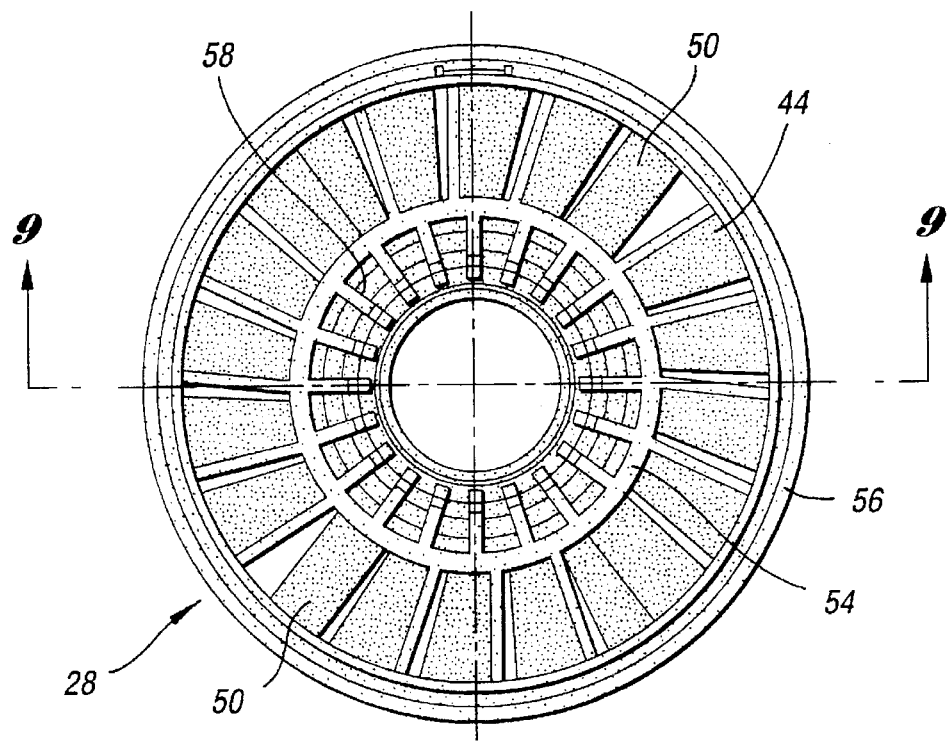
FIG. 8 shows an underside view of the stator shown in FIG. 5.
Figure 9:
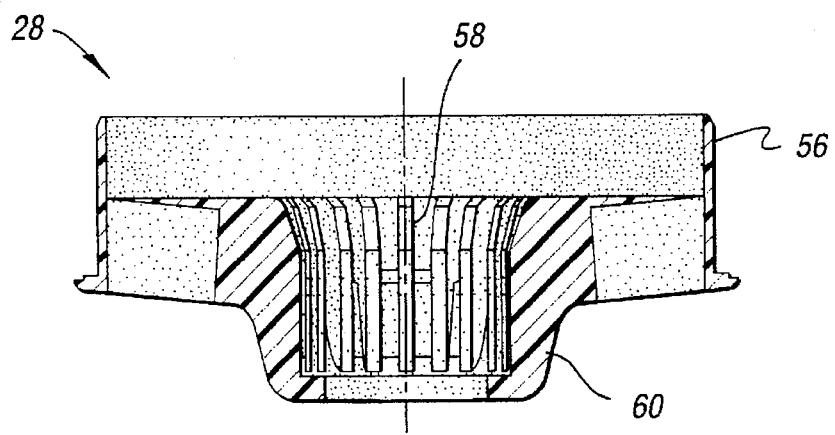
FIG. 9 shows a sectional view of the stator shown in FIG. 5 taken at line 9—9.

A first embodiment of the present invention is shown in FIGS. 4–9. FIG. 4 shows a partially cutaway sectional view of a router lower assembly 46. The lower assembly 46 includes a collet nut 48 threaded onto the shaft 38. The fan 32 draws air downward through the tubular housing 23, and through the stator 28. The stator 28 includes four bosses 50 with internally threaded apertures 51 for receiving screws which mount the stator 28 to the tubular housing 23. A bearing 52 supports the shaft 38 with respect to the stator 28.

The stator 28 is more clearly described with reference to FIGS. 5–9. The stator 28 includes stator blades 44 extending radially outwardly from annular hub 54 to the stator housing 56. Stator 28 further includes a plurality of deformable ribs 58 extending radially inwardly from annular hub 54. The deformable ribs 58 are adapted to deform slightly when bearing 52 is pressed therebetween for securing the bearing. Stator 28 further includes a downwardly extending hub portion 60.

Figure 10A:
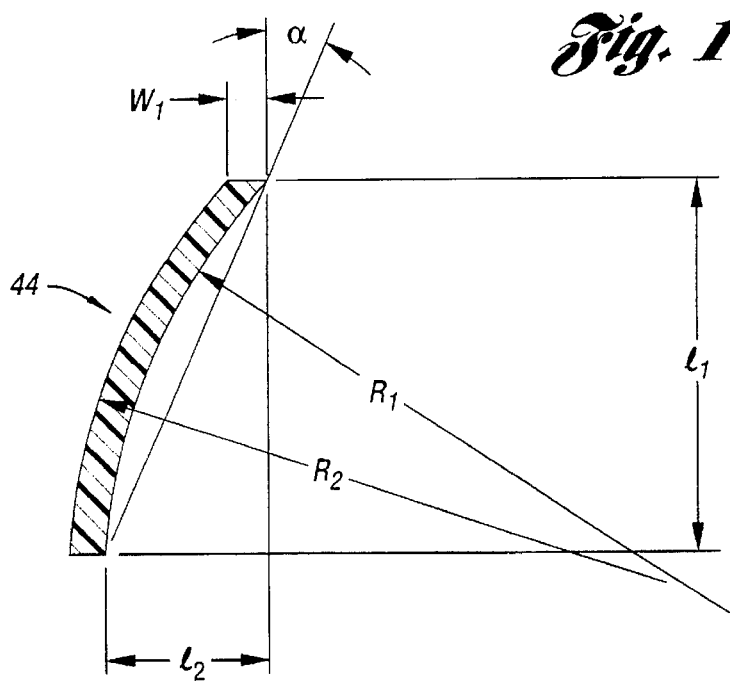
FIG. 10a shows a vertical cross section taken through a stator blade of a stator closely adjacent the hub.
Figure 10B:
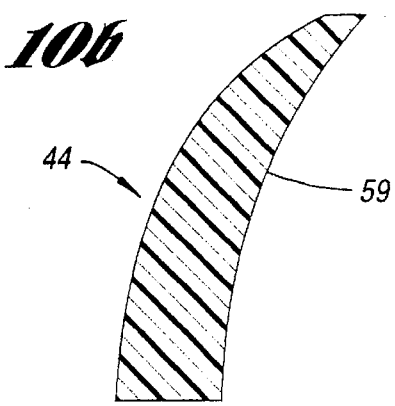
FIG. 10b shows a vertical cross section of a stator blade taken at a position equidistant the annular hub and stator housing.
Figure 10C:
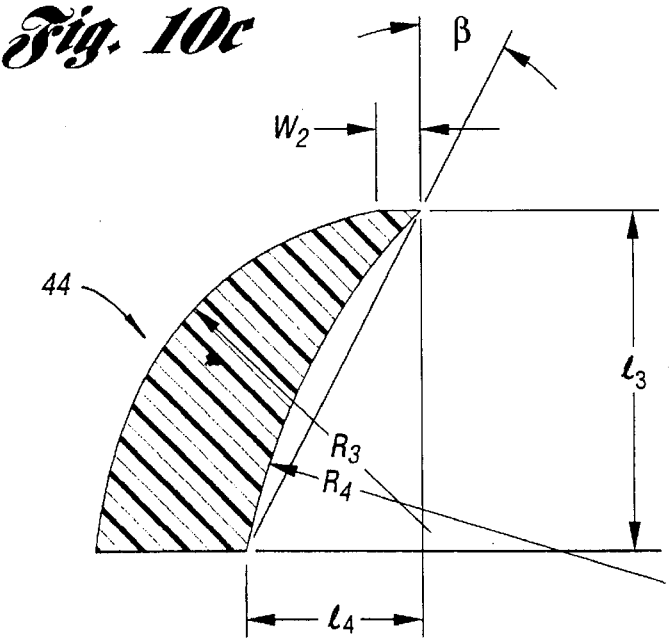
FIG. 10c shows a vertical cross-section of a stator blade taken closely adjacent the stator housing.
Figure 11:
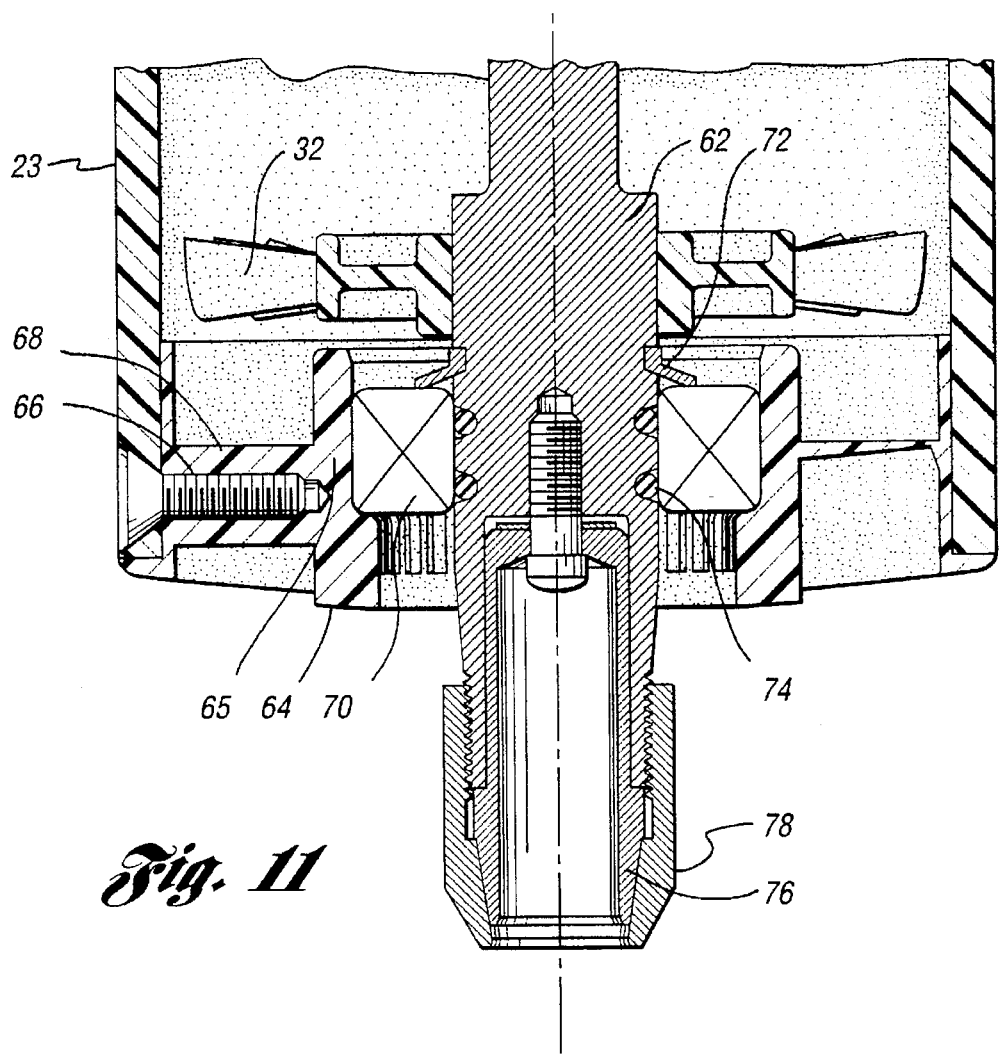
FIG. 11 shows a partially cut-away sectional view of a second embodiment of a router lower assembly in accordance with the present invention.
Figure 12:
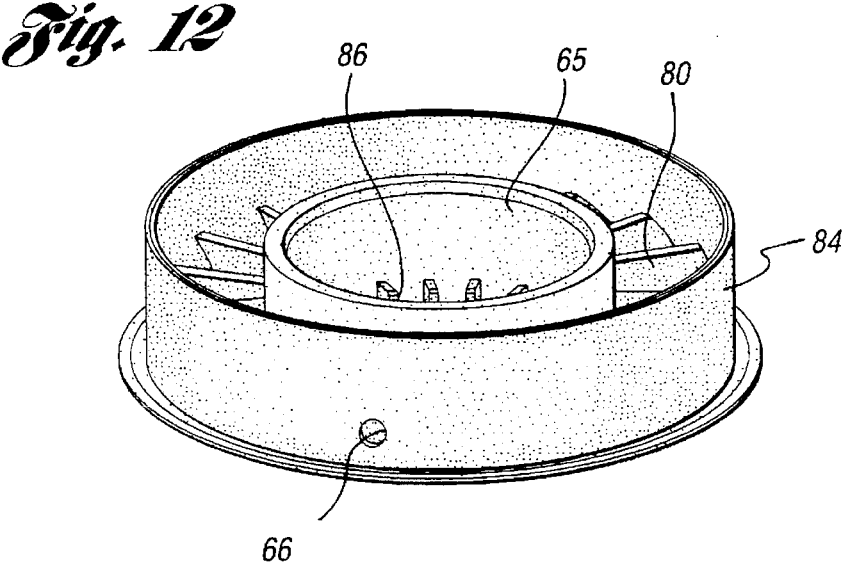
FIG. 12 shows a perspective view of the stator shown in FIG. 11.
Figure 13:
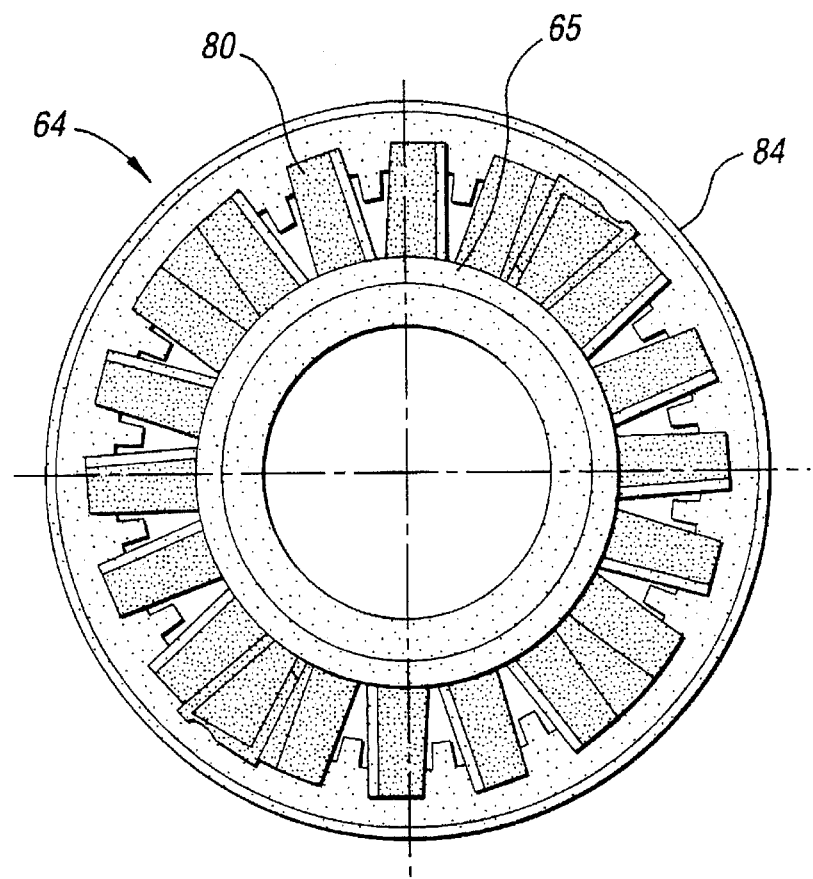
FIG. 13 shows a plan view of the stator shown in FIG. 11.
Figure 14:
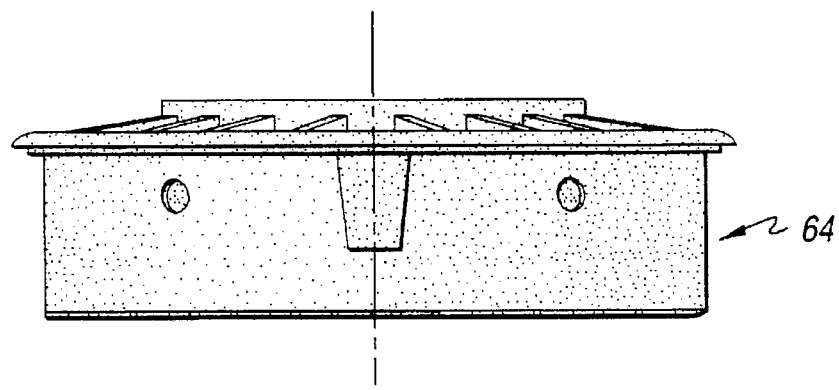
FIG. 14 shows a side view of the stator shown in FIG. 11.
Figure 15:
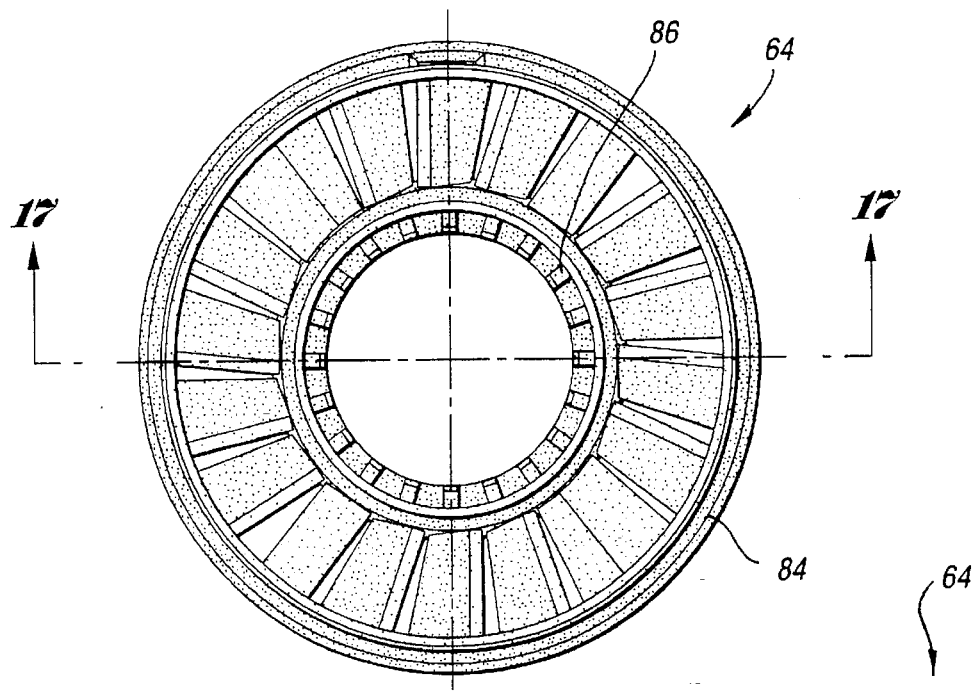
FIG. 15 shows an underside view of the stator shown in FIG. 11.
Figure 16:
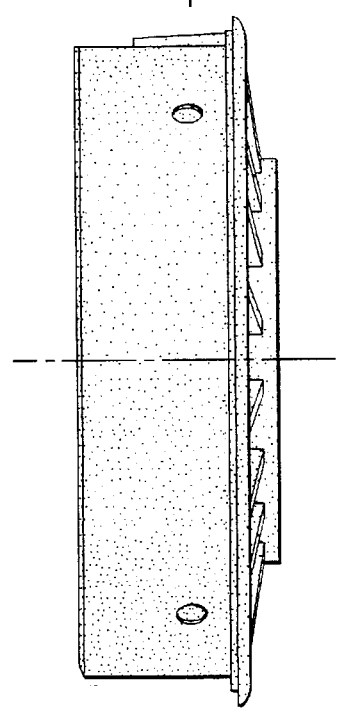
FIG. 16 shows a side view of the stator shown in FIG. 15.
Figure 17:
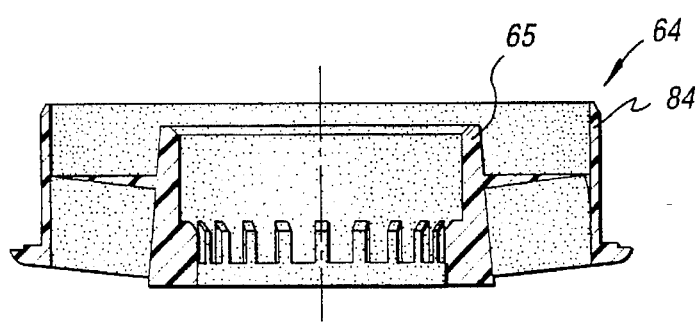
FIG. 17 shows a sectional view taken at line 17—17 of the FIG. 15.

As shown in FIGS. 10a–c, sequential cross-sections taken through a stator blade 44 from a position closely adjacent the annular hub 54 (FIG. 10a), to a position equidistant annular hub 54 and stator housing 56 (FIG. 10b), to a position closely adjacent stator housing 56 (FIG. 10c). Stator blade 44 blends from a substantially constant cross-section at its root closely adjacent annular hub 54 (FIG. 10a) to an air foil type cross-section at its end closely adjacent the stator housing 56 (FIG. 10c). As shown in FIGS. 10(a)–(c), the face 59 of the blade is concave with an average blade slope of approximately 24° relative to an axial line. The stator blade becomes steeper as the air moves axially through the router. Table A below provides preferred dimensions for the stator blade 44 to correspond with FIGS. 10a–c by way of example only. Of course, these dimensions could vary within the scope of the present invention.

TABLE A

|  | Range |
| --- | --- |
| α | 23°–25° |
| $w_1$ | .054"–.064" |
| $R_1$ | .893"–.903" |
| $R_2$ | .841"–.851" |
| $l_1$ | .526"–.536" |
| $l_2$ | .227"–.237" |
| β | 24°–26° |
| $w_2$ | .054"–.064" |
| $R_3$ | .459"–.469" |
| $R_4$ | .876"–.886" |
| $l_3$ | .480"–.490" |
| $l_4$ | .226"–.236" |

The stator could alternatively be formed integrally as part of the housing in either a clamshell type or stack-up housing design.

A second embodiment of a stator of the present invention is shown in FIGS. 11–17. The embodiment of FIG. 11 employs a larger shaft 62 than the shaft 38 shown in FIG. 4. This embodiment includes a stator 64 secured to tubular housing 23 by screws extending into the threaded apertures 66 within radially extending bosses 68 immediately below the fan 32. Stator 64 differs from stator 28 (of FIGS. 4–9) in the region of bearing hub 65. A bearing 70 is secured between the stator 64 and the shaft 62 by the retainer ring 72. O-rings 74 are disposed between bearing 70 and shaft 62. A collet 76 and collet nut 78 are also provided on the shaft 62.

The stator 64 is more clearly understood with reference to FIGS. 12–17. Stator 64 includes stator blades 80 extending radially between annular bearing hub 65 and stator housing 84. Ribs 86 extend radially inwardly from bearing hub 65 for retaining bearing 70.

While the best modes for carrying out the invention have been described in detail, those familiar with the art to which this invention relates will recognize various alternative designs and embodiments for practicing the invention within the scope of the appended claims.

What is claimed is:

1. A power tool comprising:
   a motor housing including first and second clam shell halves forming an air inlet and a stator forming an air outlet, said housing having a central axis therethrough;
   an electric motor having a rotary armature, an armature shaft and a stationary member fixed with respect to the housing;
   an axial fan fixed to the armature shaft and positioned between said rotary armature and said stator for drawing air across said armature and stationary member, said fan having a plurality of radially extending fan blades tilted with respect to said central axis for forcing air in a substantially helical path; and
   said stator having a plurality of radially extending air foil shaped stator blades oppositely tilted with respect to said fan blades and said central axis for receiving air moving in a helical path from said fan blades and causing the air to swirl in a predictable manner when leaving said housing; wherein said armature shaft is adapted to support a rotary cutting means outside of said air outlet.

2. The invention of claim 1 wherein the power tool is a router.

3. A router comprising:

a motor housing including first and second clamshell halves forming an air inlet and a stator forming an air outlet, said housing having a central axis therethrough;

an electric motor having a rotary armature, an armature shaft and a stationary member fixed with respect to the housing;

an axial fan fixed to the armature shaft and positioned between said rotary armature and said stator for drawing air across said armature and stationary member, said fan having a plurality of radially extending fan blades tilted with respect to said central axis for forcing air in a substantially helical path; and said stator having a plurality of radially extending stator blades oppositely tilted with respect to said fan blades and said central axis for receiving air moving in a helical path from said fan blades.

4. The router of claim 3, wherein said stator blades are oriented at a slightly steeper angle with respect to said central axis than said helical path.

5. The router of claim 3, wherein said stator blades each form an air foil shape.

6. The router of claim 3, wherein said fan and stator are configured to cause air to swirl in a predictable manner when leaving said housing.

7. The router of claim 3, wherein said stator further comprises an annular hub.

8. The router of claim 7, wherein said stator further comprises a plurality of deformable ribs extending radially inwardly from said hub.

9. The router of claim 3, wherein said stationary member comprises a laminate stack.

10. A router comprising:

a generally cylindrical motor housing disposed along a central axis and having first and second ends and an internal cavity, the first end providing an air inlet and the second end providing an air outlet and a central shaft outlet, wherein said air outlet comprises a stator;

an electric motor having a rotary armature, an armature shaft and a stationary member fixed with respect to the housing;

an axial fan fixed to the armature shaft and positioned between said rotary armature and said stator for drawing air across said armature and stationary member, said fan having a plurality of radially extending fan blades tilted with respect to said central axis for forcing air in a substantially helical path; and said stator having a plurality of radially extending stator blades oppositely tilted with respect to said fan blades and said central axis for receiving air moving in a helical path from said fan blades; and wherein said armature shaft is adapted to support a router bit outside of said air outlet.

11. The router of claim 10, wherein said stator blades are oriented at a slightly steeper angle with respect to said central axis than said helical path.

12. The router of claim 10, wherein said stator blades each form an air foil shape.

13. The router of claim 10, wherein said fan and stator are configured to cause air to swirl in a predictable manner when leaving said housing.

14. The router of claim 10, wherein said stator further comprises an annular hub.

15. The router of claim 14, wherein said stator further comprises a plurality of deformable ribs extending radially inwardly from said hub.

16. The router of claim 10, wherein said stationary member comprises a laminate stack.

* * * * *

UNITED STATES PATENT AND TRADEMARK OFFICE
CERTIFICATE OF CORRECTION

PATENT NO. : 5,632,578

DATED : May 27, 1997

INVENTOR(S) : RONALD C. McCURRY, et al.

It is certified that error appears in the above-identified patent and that said Letters Patent is hereby corrected as shown below:

Column 5, Line 20,   following "blades" insert ";
and wherein said armature shaft
is adapted to support a router
bit outside of said air outlet.

Signed and Sealed this

Twenty-third Day of June, 1998

Attest:

BRUCE LEHMAN

*Attesting Officer*   *Commissioner of Patents and Trademarks*